United States Patent
Apostolides

(10) Patent No.: US 11,306,629 B2
(45) Date of Patent: Apr. 19, 2022

(54) AUTONOMOUS OIL CHANGE SYSTEM

(71) Applicant: RPM INDUSTRIES, LLC, Washington, PA (US)

(72) Inventor: John K. Apostolides, Pittsburgh, PA (US)

(73) Assignee: RPM INDUSTRIES, LLC, Washington, PA (US)

( * ) Notice: Subject to any disclaimer, the term of this patent is extended or adjusted under 35 U.S.C. 154(b) by 0 days.

(21) Appl. No.: 16/941,997

(22) Filed: Jul. 29, 2020

(65) Prior Publication Data

US 2021/0033007 A1 Feb. 4, 2021

Related U.S. Application Data

(60) Provisional application No. 62/879,977, filed on Jul. 29, 2019.

(51) Int. Cl.
*F01M 11/04* (2006.01)
*F01M 11/10* (2006.01)

(52) U.S. Cl.
CPC .......... *F01M 11/0458* (2013.01); *F01M 11/10* (2013.01); *F01M 2011/148* (2013.01); *F01M 2250/00* (2013.01)

(58) Field of Classification Search
CPC ............... F01M 11/0458; F01M 11/10; F01M 2011/148
See application file for complete search history.

(56) References Cited

U.S. PATENT DOCUMENTS

| | | | |
|---|---|---|---|
| 5,765,612 A | 6/1998 | Morin | |
| 6,286,626 B1 * | 9/2001 | Evans | F01M 11/0458 |
| | | | 141/98 |
| 2006/0096809 A1 | 5/2006 | Evans | |
| 2007/0113894 A1 | 5/2007 | Apostolides | |
| 2007/0113921 A1 | 5/2007 | Capizzo | |
| 2020/0079640 A1 | 3/2020 | Lawler, III et al. | |

OTHER PUBLICATIONS

"10 Best Fluid Evacuators 2019," Ezvid Wiki, https://www.youtube.com/watch?v=3MabMZcdw-o, Dec. 6, 2018 (Year: 2018).*
International Search Report and Written Opinion of the International Searching Authority for International Application No. PCT/US2020/043996 dated Oct. 1, 2020.

(Continued)

*Primary Examiner* — Kevin A Lathers
(74) *Attorney, Agent, or Firm* — K&L Gates LLP

(57) ABSTRACT

An oil change system. The oil change system includes an evacuation system, a refill system, one or more sensors and a control circuit. The evacuation system includes a first quick connect fitting configured to mate with a quick connect valve of a vehicle. The refill system includes a second quick connect fitting configured to mate with the quick connect valve of the vehicle. The control circuit is coupled to the evacuation system, the refill system and the one or more sensors, and is configured to automatically identify the vehicle, determine a type, a viscosity and a volume of oil associated with the vehicle and control a volume of new oil added to the vehicle.

20 Claims, 10 Drawing Sheets

(56) References Cited

OTHER PUBLICATIONS

Launch Tech Co., Ltd., "TOC-317 | oil drainer with vacuum | Launch" you tube video, Sep. 20, 2019, accessed from <URL: https://www.youtube.com/watch?v=hWTlCfgYgo>, entire video.
Le "Benchmarking Convolutional Neural Networks for Object Segmentation and Pose Estimation", Thesis, Massachusetts Institute of Technology, Sep. 2017, accessed from <URL: https://dspace.mit.edu/bitstream/handle/1721.1/119531/1066740404-MIT.pdf?sequence=1&isAllowed=y, entire document.

* cited by examiner though not explicitly set forth herein will be within the scope of the invention.

AUTONOMOUS OIL CHANGE SYSTEM

CROSS-REFERENCE TO RELATED APPLICATION

This application claims the benefit under 35 U.S.C. § 119(e) of the earlier filing date of U.S. Provisional Patent Application No. 62/879,977 filed on Jul. 29, 2019, titled AUTONOMOUS OIL CHANGE SYSTEM, the contents of which are hereby incorporated by reference in their entirety.

BACKGROUND

Changing the motor oil in a motorized vehicle generally involves draining the "old" motor oil, replacing the "old" oil filter with a "new" oil filter, and adding "new" motor oil to the engine. For traditional oil changes, the drain plug located under the oil pan at the bottom of the engine is unscrewed and the force of gravity is relied on to have the "old" motor oil drain out of the vehicle. After the "old" oil has drained out of the vehicle, the drain plug is reinstalled, either with the existing drain plug gasket or with a new drain plug gasket. The "old" oil filter is then unscrewed and replaced with a "new" oil filter. With the drain plug reinstalled and the "new" oil filter installed, the "new" oil is added to the engine, typically through an opening positioned at the top of the engine.

In order to perform the traditional oil change, certain equipment and tools are generally required. For example, jacks, lifts or ramps are often utilized to provide sufficient access to the underside of the vehicle, socket sets are often utilized to unscrew the drain plug, containers are often utilized to catch the drained oil, filter wrenches are often utilized to remove the "old" oil filter and funnels are often utilized to add the "new" oil. Care must also be taken to secure the correct size drain plug gasket, the correct size oil filter and the recommended "new" oil (e.g., synthetic or non-synthetic, viscosity, etc.). For a person or family with multiple vehicles, or a shop which services multiple vehicles, each of these can vary from vehicle to vehicle, thereby increasing the costs associated with the equipment and tools needed to perform the oil change.

Additionally, despite due care being taken when performing the traditional oil change, it is not uncommon for at least some of the oil to wind up on the ground, on the clothes of the person performing the oil change or on the hands/skin of the person performing the oil change. Any spillage of oil onto the ground constitutes an unwanted environmental incident, and if the oil is relatively hot, as is often the case, the spillage onto the clothes or hands/skin can cause unwanted burns to the person performing the oil change.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
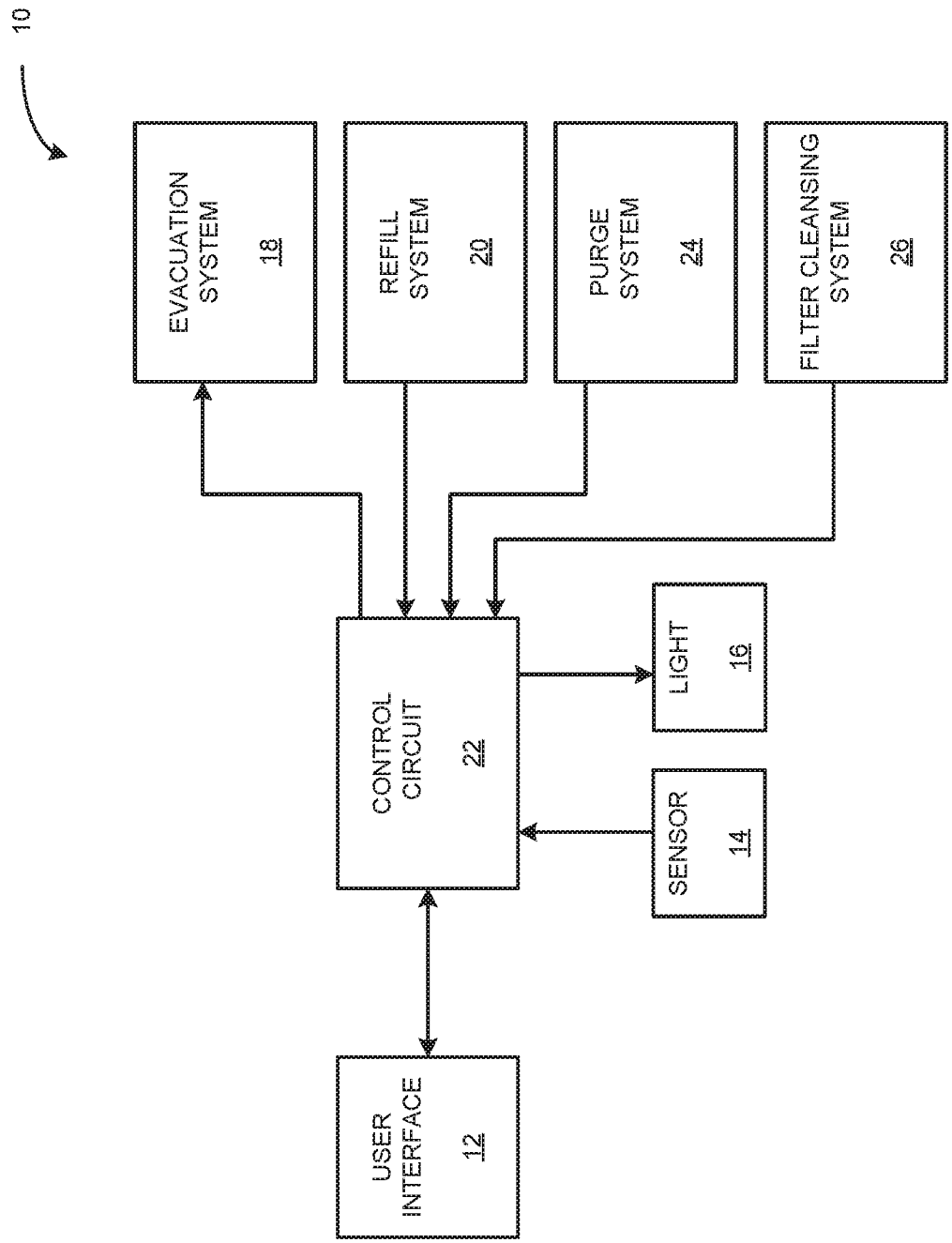
FIG. 1 illustrates an autonomous oil change system, in accordance with at least one aspect of the present disclosure.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the autonomous oil change system in detail, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the autonomous oil change system disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, below, left, right, interior, exterior and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

FIG. 1 illustrates an autonomous oil change system 10, in accordance with at least one aspect of the present disclosure. The autonomous oil change system 10 includes a user interface 12, one or more sensors 14, one or more indicating lights 16, an evacuation system 18, a refill system 20 and a control circuit 22. According to various aspects, the autonomous oil change system 10 may also include a purge system 24 and a filter cleansing system 26. For instances where the vehicle is equipped with a quick fit valve, a reusable oil filter (or a plurality of reusable oil filters) and a radio-frequency identification (RFID) tag or other means of identification, the autonomous oil change system 10 can be a stand-alone, unmanned station which performs an automated engine oil change in remote locations or at designated service providers.

Figure 2:
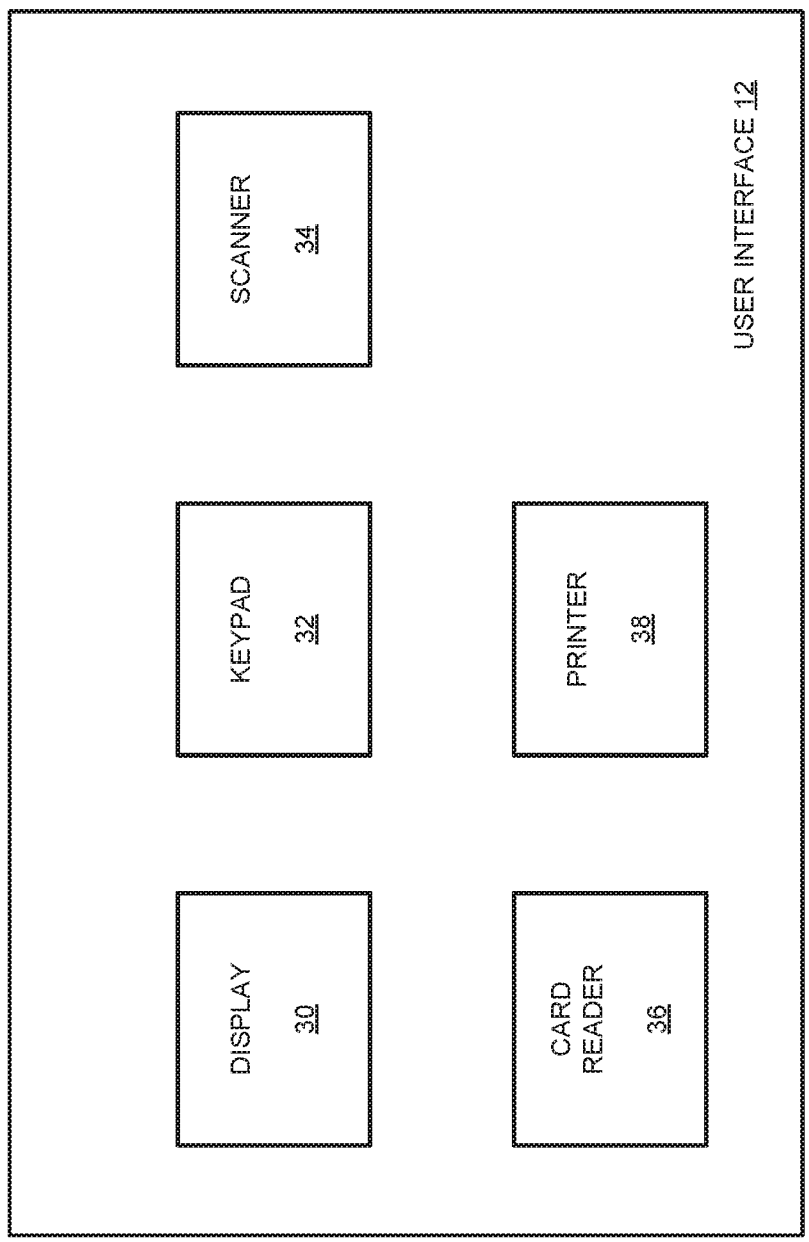
FIG. 2 illustrates a user interface of the autonomous oil change system of FIG. 1, in accordance with at least one aspect of the present disclosure.

The user interface 12, as shown in FIG. 2 in accordance with at least one aspect of the present disclosure, includes a display 30, a keypad 32, an optical scanner 34, a card reader 36, and a printer 38. The display 30 provides information, such as for example, the make and model of the vehicle, the type of oil (synthetic or non-synthetic) to be used, the viscosity of the oil to be used, the cost for the oil change service, etc. The keypad 32 allows for the user to provide input data to the autonomous oil change system 10 such as, for example, an upgrade to a synthetic oil, a request for a printed receipt, etc. The optical scanner 34 is configured to read a card such as, for example, a membership card or a rewards card associated with the vehicle or the operator of the vehicle. The card reader 36 is configured to read a credit card, a debit card, a gift card and the like in order to secure payment for the oil change service to be provided. The printer 38 is configured to print a receipt and/or other information for the user/operator of the vehicle.

Figure 3:
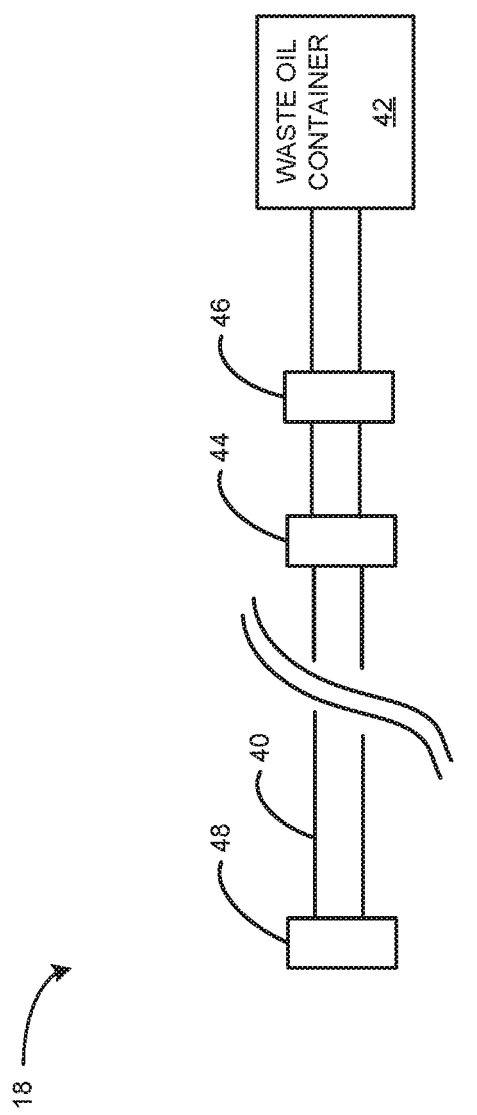
FIG. 3 illustrates an evacuation system of the autonomous oil change system of FIG. 1, in accordance with at least one aspect of the present disclosure.

The evacuation system 18, as shown in FIG. 3 in accordance with at least one aspect of the present disclosure, includes hosing 40 which is coupled to a "waste oil" container 42 via a valve 44 and a pump 46. The "waste oil" container 42 is configured to receive the "waste oil" being evacuated from the vehicle and the valve 44 may be utilized to stop the flow of the "waste oil" being evacuated from the vehicle. Although only one "waste oil" container 42, one valve 44 and one pump 46 are shown in FIG. 3, it will be appreciated that the hosing 40 may be coupled to any number of "waste oil" containers 42 via any number of valves 44 and pumps 46. The hosing 40 can be wound on a hose reel (not shown) and has a quick fit connector 48 coupled to an end of the hosing 40. The quick fit connector 48 is configured to mate with the quick fit valve of the vehicle. According to various aspects, a sensor (e.g., one of the sensors 14) of the autonomous oil change system 10 is configured to sense whether a connection has been made between the quick fit connector 48 and the quick fit valve of the vehicle.

Figure 4:
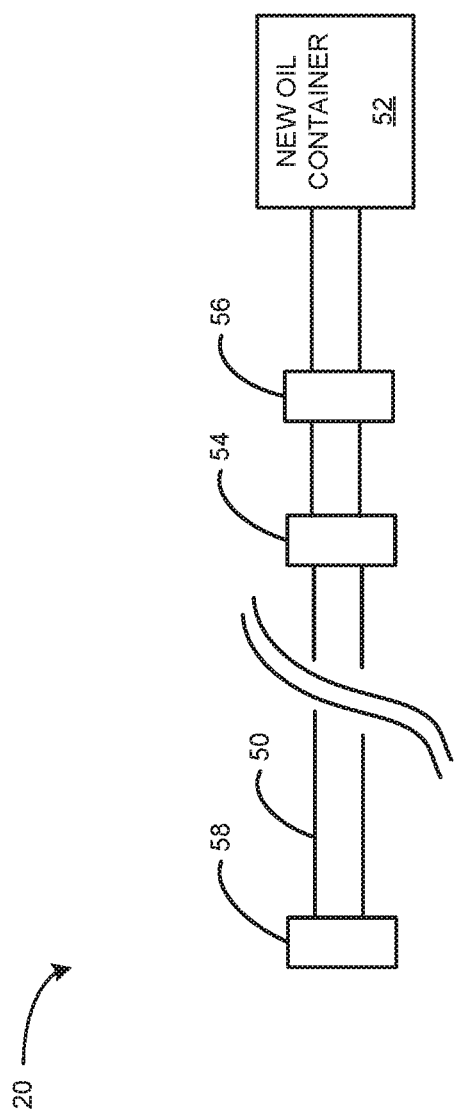
FIG. 4 illustrates a refill system of the autonomous oil change system of FIG. 1, in accordance with at least one aspect of the present disclosure.

The refill system 20, as shown in FIG. 4 in accordance with at least one aspect of the present disclosure, includes hosing 50 which is coupled to a "new oil" container 52 via a valve 54 and a pump 56. The "new oil" container 52 contains the "new oil" utilized to refill the motor oil of the vehicle and the valve 44 may be utilized to stop the flow of the "new oil" being provided to the vehicle. Although only one "new oil" container 52, one valve 54 and one pump 56 are shown in FIG. 4, it will be appreciated that the hosing 50 may be coupled to any number of "new oil" containers 52 via any number of valves 54 and pumps 56. The hosing 50 can be wound on a hose reel (not shown) and has a quick fit connector 58 coupled to an end of the hosing 50. The quick fit connector 58 is configured to mate with the quick fit valve of the vehicle. According to various aspects, a sensor (e.g., one of the sensors 14) of the autonomous oil change system 10 is configured to sense whether a connection has been made between the quick fit connector 58 and the quick fit valve of the vehicle.

Figure 5:
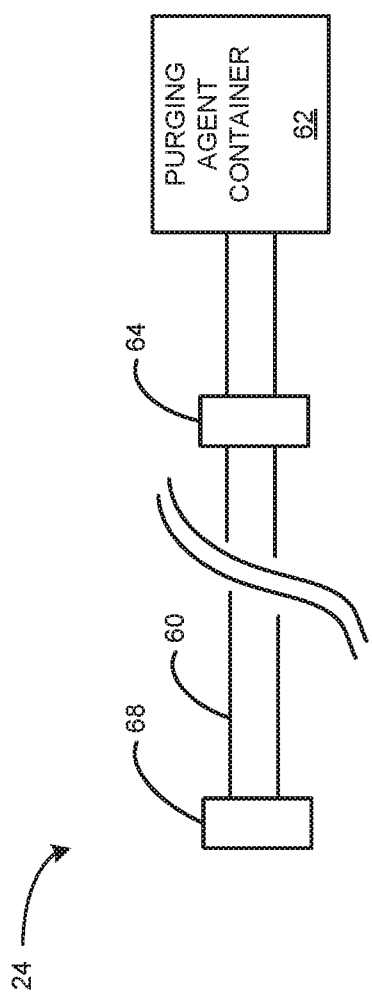
FIG. 5 illustrates a purge system of the autonomous oil change system of FIG. 1, in accordance with at least one aspect of the present disclosure.

The purge system 24, as shown in FIG. 5 in accordance with at least one aspect of the present disclosure, includes hosing 60 which is coupled to a purging agent container 62 via a valve 64. The purging agent container 62 contains a pressurized purging agent (e.g., air or nitrogen) and the valve 64 may be utilized to stop the flow of the purging agent provided to the vehicle. The hosing 60 can be wound on a hose reel (not shown) and has a quick fit connector 68 coupled to an end of the hosing 60. The quick fit connector 68 is configured to mate with the quick fit valve of the vehicle. According to various aspects, a sensor (e.g., one of the sensors 14) of the autonomous oil change system 10 is configured to sense whether a connection has been made between the quick fit connector 68 and the quick fit valve of the vehicle.

Figure 6:
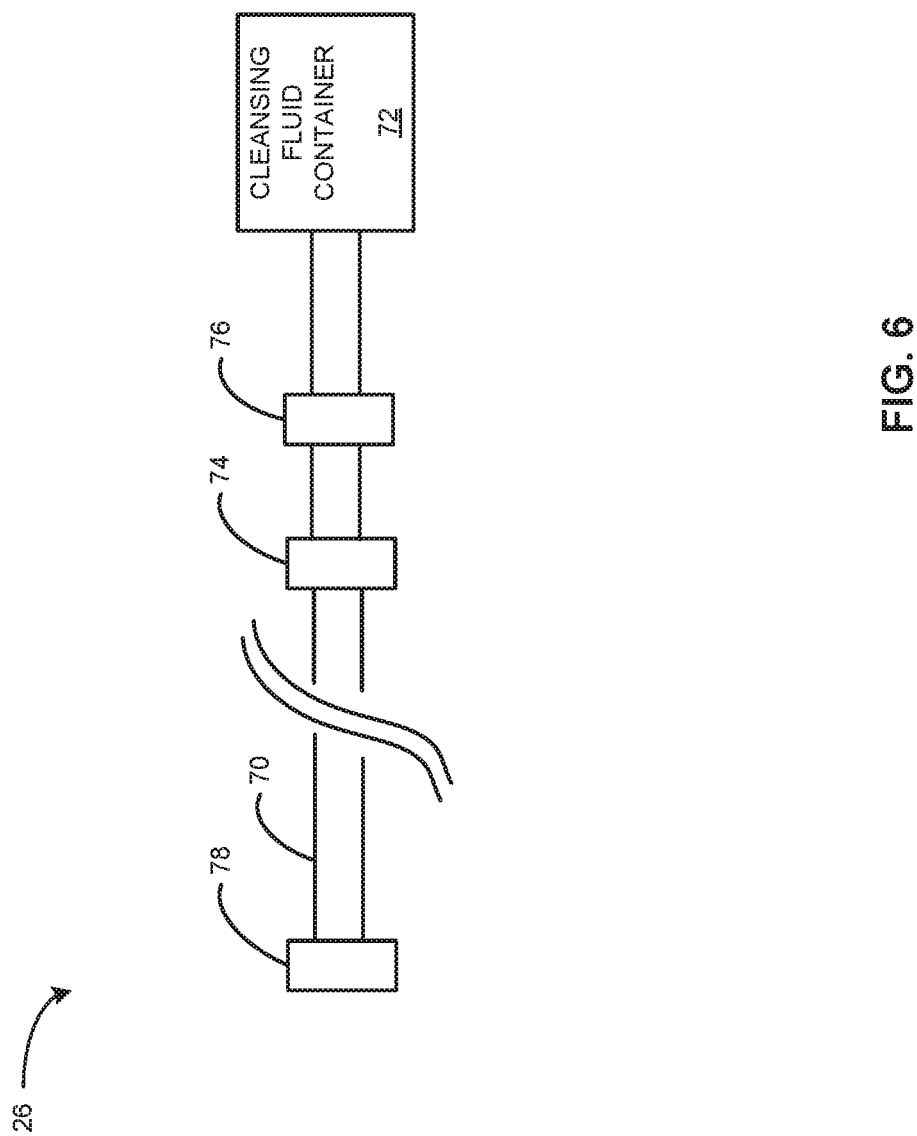
FIG. 6 illustrates a filter cleansing system of the autonomous oil change system of FIG. 1, in accordance with at least one aspect of the present disclosure.

The filter cleansing system 26, as shown in FIG. 6 in accordance with at least one aspect of the present disclosure, includes hosing 70 which is coupled to a cleansing fluid container 72 via a valve 74 and a pump 76. The cleansing fluid container 72 contains a cleansing fluid and the valve 74 may be utilized to stop the flow of the cleansing fluid provided to the vehicle. The hosing 70 can be wound on a hose reel (not shown) and has a quick fit connector 78 coupled to an end of the hosing 70. The quick fit connector 78 is configured to mate with the quick fit valve of the vehicle. According to various aspects, a sensor (e.g., one of the sensors 14) of the autonomous oil change system 10 is configured to sense whether a connection has been made between the quick fit connector 78 and the quick fit valve of the vehicle.

Figure 7:
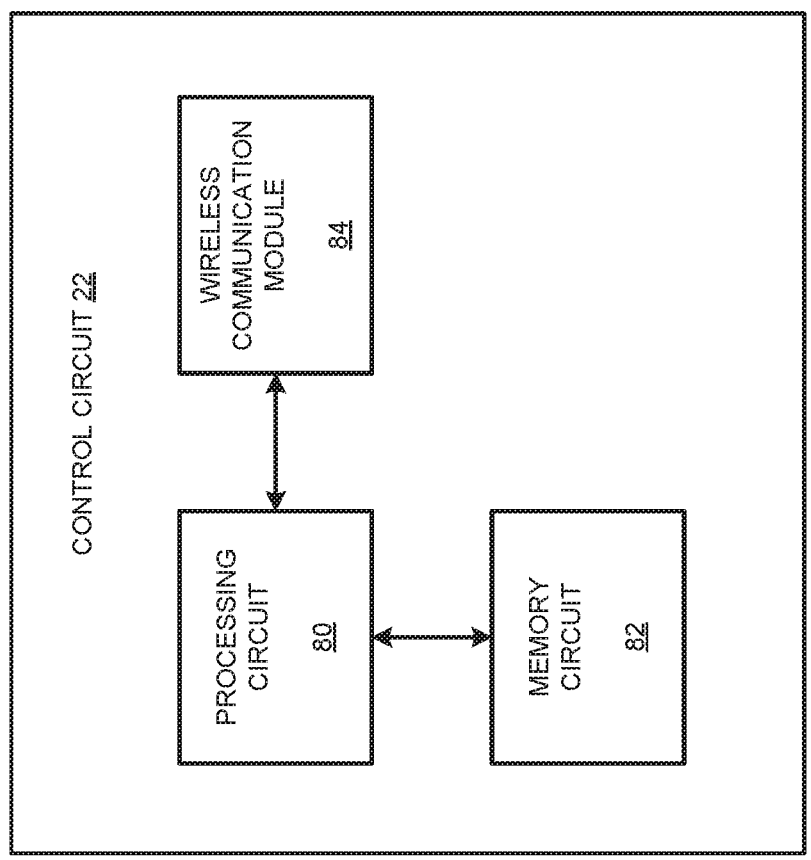
FIG. 7 illustrates a control circuit of the autonomous oil change system of FIG. 1, in accordance with at least one aspect of the present disclosure.

The control circuit 22 is coupled to the user interface 12, the one or more sensors 14, the one or more indicating lights 16, the evacuation system 18, the refill system 20, the purge system 24 and the filter cleansing system 26 (See FIG. 1). As shown in FIG. 7 in accordance with at least one aspect of the present disclosure, the control circuit 22 includes a processing circuit 80, a memory circuit 82 and a wireless communication module 84.

The processing circuit 80 may be, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The processing circuit 80 may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, the processing circuit 80 may include, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The memory circuit 82 is coupled to the processing circuit 80 and may include more than one type of memory. For example, according to various aspects, the memory 82 circuit may include volatile memory and non-volatile memory. The volatile memory can include random access memory (RAM), which can act as external cache memory. According to various aspects, the random access memory can be static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), Synchlink dynamic random access memory (SLDRAM), direct Rambus random access memory (DRRAM) and the like. The non-volatile memory can include read-only memory (ROM), programmable read-only memory (PROM), electrically programmable read-only memory, electrically erasable programmable read-only memory (EEPROM), flash memory and the like. According to various aspects, the memory circuit 82 can also include removable/non-removable, volatile/non-volatile storage media, such as for example disk storage. The disk storage can include, but is not limited to, devices like a magnetic disk drive, a floppy disk drive, a tape drive, a Jaz drive, a Zip drive, a LS-60 drive, a flash memory card, or a memory stick. In addition, the disk storage can include storage media separately or in combination with other storage media including, but not limited to, an optical disc drive such as a compact disc ROM device (CD-ROM), a compact disc recordable drive (CD-R Drive), a compact disc rewritable drive (CD-RW Drive), a digital versatile disc ROM drive (DVD-ROM) and the like.

The wireless communication module 84 is configured to enable communication between the autonomous oil change system 10 and other devices/systems, including the vehicle, via a network 132 (See FIG. 10), where the communications between the wireless communications module 84 and the network 132 are wireless communications. For example, according to various aspects, as the vehicle approaches the autonomous oil change system 10, the vehicle may emit a wireless signal associated with a radio-frequency identification (RFID) tag of the vehicle and the control circuit 22 may be configured to utilize the signal to automatically identify the vehicle based on the signal. For example, based on the received signal, the control circuit 22 may access a database of vehicles enrolled in member service rolls and match information in the signal (e.g., a vehicle ID) with a vehicle in the database. For such vehicles, the database includes information regarding make, model, year and engine of the vehicle, as well as the type, viscosity and volume of oil for the vehicle. Thus, based on the information in the database, the control circuit 22 identifies the make, model, year and engine of the vehicle and determines the type, viscosity and volume of oil associated with the vehicle. Stated differently, the control circuit 22 determines the type, viscosity and volume of "new oil" to be added to the engine of the vehicle during a refill operation.

The wireless communication module 84 can employ any suitable wireless communication technology. For example, according to various aspects, the wireless communication module 84 can employ, Bluetooth, Z-Wave, Thread, ZigBee, and the like. Similarly, the wireless communication module 84 can employ any one of a number of wireless communication standards or protocols, including but not limited to Wi-Fi (IEEE 802.11 family), WiMAX (IEEE 802.16 family), IEEE 802.20, long-term evolution (LTE), and Ev-DO, HSPA+, HSDPA+, HSUPA+, EDGE, GSM, GPRS, CDMA, TDMA, DECT, and Ethernet derivatives thereof, as well as any other wireless protocols that are designated as 3G, 4G, 5G, and beyond.

Figure 8:
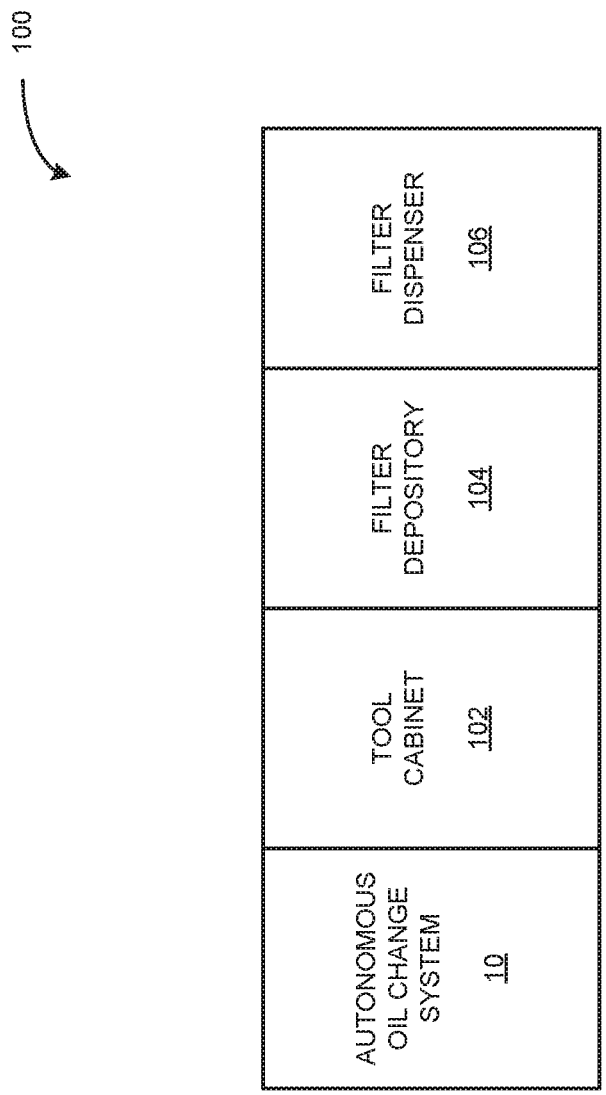
FIG. 8 illustrates an autonomous oil change system, in accordance with at least one other aspect of the present disclosure.

FIG. 8 illustrates an autonomous oil change system 100, in accordance with at least one other aspect of the present disclosure. The autonomous oil change system 100 includes the autonomous oil system 10 as described above (including the user interface 12, the one or more sensors 14, the one or more indicating lights 16, the evacuation system 18, the refill system 20, the control circuit 22, the purge system 24 and the filter cleansing system 26), and also includes a tool cabinet 102, a filter depository 104 and a filter dispenser 106.

The tool cabinet 102 houses filter wrenches for a variety of different sized oil filters, and other miscellaneous tools (socket sets, screw drivers, etc.) and supplies (e.g., gloves, paper towels, hand cleaner, etc.) which are useful for changing an oil filter and/or performing an oil change service. According to various aspects, the hosing 40, 50, 60, 70 and the hose reels associated therewith form a part of the tool cabinet 102. The tool cabinet 102 can include sensors and processing circuitry to know which tools and supplies have been removed from the tool cabinet 102 and which tools have been returned to the tool cabinet 102. The processing circuitry is coupled to the control circuit 22. For instances where the vehicle only includes a conventional oil filter (or filters)—not a reusable oil filter (or filters), the person associated with the vehicle (e.g., the driver of the vehicle or a service technician) can utilize the tools and supplies in the tool cabinet 102 to remove and replace the conventional oil filter following the evacuation aspect of the oil change service as described below. The conventional filter to be removed contains less liquid waste as a result of the purging and filter cleansing aspects of the oil change service, thereby mitigating the risk of oil spills and burns which can occur during the removal of the oil filter. After the replacement of the oil filter with a new oil filter, the autonomous oil change system 100 can simply activate the new oil refilling aspect of the oil change service as described below.

The filter depository 104 is configured to receive the oil filter (or oil filters), either reusable or conventional, which has been removed from the vehicle. According to various aspects, the person associated with the vehicle can deposit the removed oil filter (or oil filters) into the filter depository 104. According to various aspects, the filter depository 104 may include one or more sensing devices which are configured to measure various properties of the relatively small amounts of oil remaining in the removed oil filter (e.g., dielectric constant, inductive characteristics, optical properties, spectrographic characteristics, magnetic properties, etc.) and output signals indicative of the measurements. The control circuit 22 subsequently utilizes the output signals of the one or more sensing devices of the filter depository 104 to determine the parameters associated with the oil. The control system 22 may also then utilize the determined parameters to analyze a condition/quality of the oil. All of the determined parameters, the respective times the determinations were made, the determined quality/condition of the oil, etc. can be stored in the memory circuit 82 of the control circuit 22 and communicated to the owner of the vehicle via any device, computing system and the like which is connected to the network 132. Thus, the filter depository 104 is coupled to the control circuit 22. According to other aspects, the removed oil filter may be placed into a small container (e.g., a closable bag) which identifies the oil filter with the vehicle it was removed from. The relatively small amounts of oil remaining in the removed oil filter may be subsequently analyzed off-site to determine a condition/quality of the oil. According to other aspects, oil from the oil filter may be placed into a small container (e.g., a vial, a bottle, etc.) which identifies the vehicle the oil was removed from. The oil from the oil filter may be subsequently analyzed off-site to determine a condition/quality of the oil.

The filter dispenser 106 is configured to dispense a new oil filter which is suitable for the vehicle. The filter dispenser 106 is coupled to the control circuit 22 and knows which oil filter to dispense based on the identified vehicle (either via the signal from the vehicle or the information entered via the keypad by a person associated with the vehicle). Once the new oil filter has been dispensed, the person associated with the vehicle may utilize the tools and supplies from the tool cabinet 102 to install the new oil filter. Of course, as the autonomous oil change system 100 may be located on the premises of the service provider, for instances where the service provider has its own filter inventories which are distinct from the filter dispenser 106, the person associated with the vehicle may simply secure the new oil filter from the service provider's own oil filter inventories.

Once the new oil filter (or oil filters) has been installed on the vehicle, the person associated with the vehicle may then commence the new oil refill aspect of the oil change service as described below.

Figure 9:
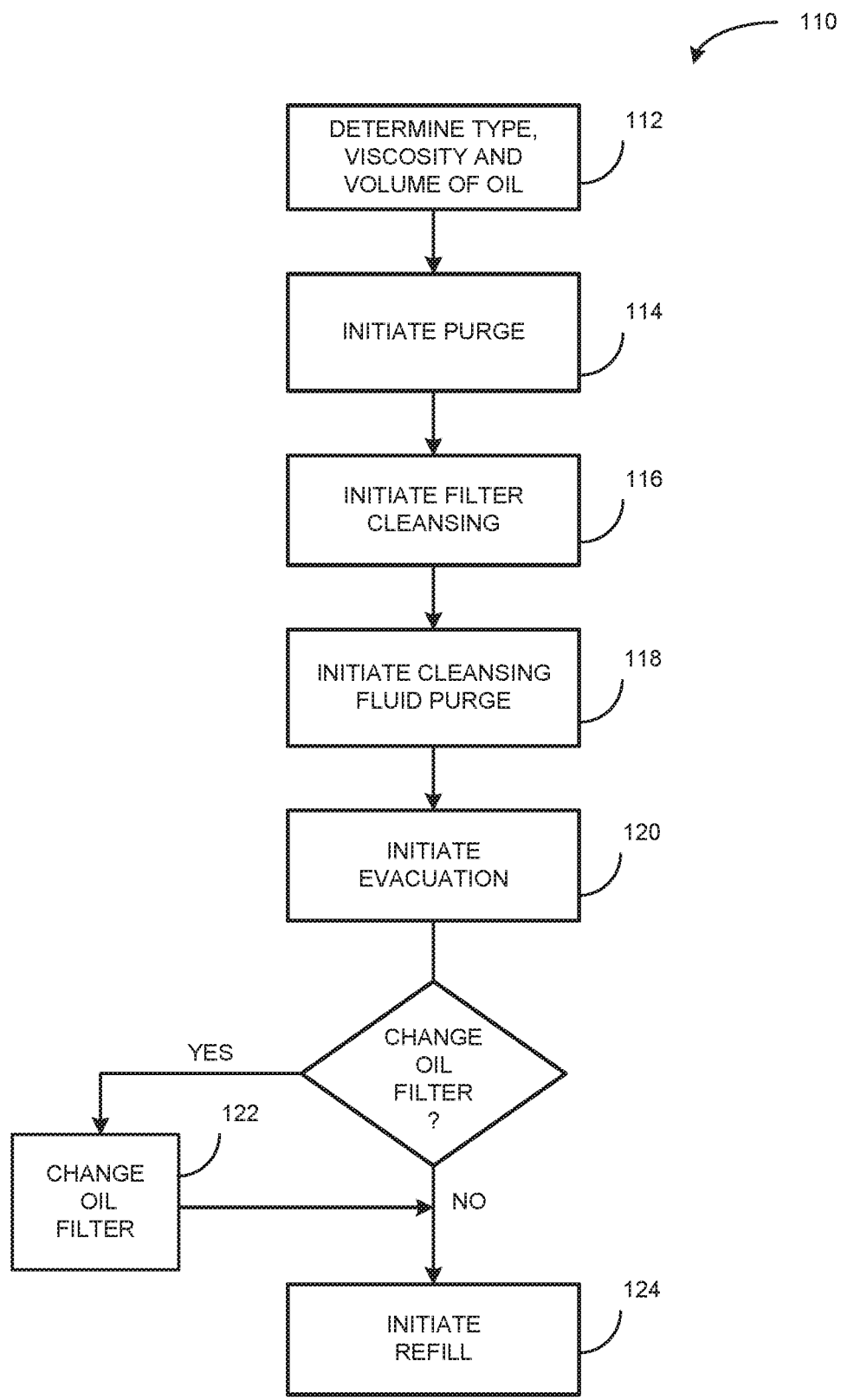
FIG. 9 illustrates a method of performing an oil change service in accordance with at least one aspect of the present disclosure.

FIG. 9 illustrates a method 110 of performing an oil change service in accordance with at least one aspect of the present disclosure. In operation, as a vehicle approaches the autonomous oil change system 10, the control circuit 22 recognizes whether the vehicle has a service ID associated with vehicles enrolled in member service rolls. For such instances, the control circuit 22 identifies the vehicle make, model, year and engine and determines 112 the type, viscosity and volume of oil for the vehicle. The control circuit 22 also prompts the driver of the vehicle to drive the vehicle onto the designated service pad, utilizes one or more of the one or more sensors 14 to determine the position of the vehicle relative to the designated service pad and controls the operation of the one or more lights 16 to light up when the vehicle is properly positioned on the designated service pad.

Once the vehicle is properly positioned on the designated service pad, a person associated with the vehicle (e.g., a driver of the vehicle, a service technician, etc.) can turn the vehicle off and lift the hood of the vehicle for service. For instances where the vehicle does not have a service ID associated with vehicles enrolled in member service rolls, the person associated with the vehicle can utilize the user interface 12 to input the relevant data (vehicle make, model, engine, etc.). The control circuit 22 then utilizes the information input by the person associated with the vehicle to determine 112 the type, viscosity and volume of oil for the vehicle.

For aspects of the autonomous oil change system 10 which include the purge system 24, the person associated with the vehicle can then initiate 114 the purge aspect of the oil change service by attaching the quick fit connector 68 coupled to an end of the hosing 60 of the purge system 24 to the quick fit valve of the vehicle. According to various aspects, a sensor (e.g., one of the sensors 14) is configured to sense that the connection between the quick fit connector 68 and the quick fit valve of the vehicle has been made, generate a signal indicative of the connection having been made, and communicate the signal to the control circuit 22. Upon receipt of the signal, the control circuit 22 operates to allow the purge aspect of the oil change service to begin. According to various aspects, without the signal, the control circuit 22 operates as if the connection has not been made and prevents the purge aspect of the oil change service from beginning. In other words, the control circuit 22 locks out the purge aspect of the oil change service until the signal is communicated from the sensor.

For the purge aspect of the oil change service, the autonomous oil change system 10 introduces the pressurized purging agent from the purging agent container 62 to the quick fit valve of the vehicle, and the pressurized purging agent operates to purge oil from the existing oil filter (or filters) into the engine sump. The pressurized purging agent acts to dislodge and remove any trapped particulate or oil from the oil filter (or oil filters) of the vehicle, thereby allowing for the dislodged particulate or oil to be subsequently removed from the engine sump during an evacuation aspect of the oil change service. Although the oil filter purge can operate for any reasonable amount of time, the purge aspect of the oil change service is typically completed within approximately 10-20 seconds.

According to various aspects, following completion of the purge aspect of the oil change service, for aspects of the autonomous oil change system 10 which include the filter cleansing system 26, the person associated with the vehicle can then initiate 116 the filter cleansing aspect of the oil change service by attaching the quick fit connector 78 coupled to an end of the hosing 70 of the filter cleansing system 26 to the quick fit valve of the vehicle. According to various aspects, a sensor (e.g., one of the sensors 14) is configured to sense that the connection between the quick fit connector 78 and the quick fit valve of the vehicle has been made, generate a signal indicative of the connection having been made, and communicate the signal to the control circuit 22. Upon receipt of the signal, the control circuit 22 operates to allow the filter cleansing aspect of the oil change service to begin. According to various aspects, without the signal, the control circuit 22 operates as if the connection has not been made and prevents the filter cleansing aspect of the oil change service from beginning. In other words, the control circuit 22 locks out the filter cleansing aspect of the oil change service until the signal is communicated from the sensor.

For the filter cleansing aspect of the oil change service, the autonomous oil change system 10 introduces the cleansing fluid from the filter cleaning container 72 to the quick fit valve of the vehicle, which is coupled to the reusable oil filter of the vehicle. An example of a reusable filter can be found, for example, in U.S. Patent Application Publication No. 20190282935, the entire content of which is hereby incorporated by reference. The cleansing fluid is introduced to the reusable filter in reverse flow—from a clean side of the filter to an unfiltered side. The cleansing fluid acts to back flush contaminants from the 'unfiltered' side of filter media. The control circuit 22 is configured to monitor the cleansing fluid used for the filter cleansing, and determine when contaminants in the cleansing fluid have reached a desired level. Once the desired level has been reached, the control circuit 22 may operate to stop the filter cleansing aspect of the oil change service.

Following completion of the filter cleansing aspect of the oil change service, according to various aspects, the person associated with the vehicle can then initiate 118 the cleansing fluid purge aspect of the oil change service by attaching the quick fit connector 68 of the purge system 24 to the quick fit valve of the vehicle. Once the control circuit 22 establishes that a connection has been made between the quick fit connector 68 and the quick fit valve of the vehicle, the control circuit 22 allows the introduction of a pressurized fluid (e.g., air or nitrogen) into the quick fit valve of the vehicle to purge cleansing fluid from the filter which has just been cleaned. On removal of all the cleansing fluid from filter, the control circuit 22 may stop the cleansing fluid purge aspect of the oil change service. Although the purge system 24 and the filter cleansing system 26 have been described as two separate systems, it will be appreciated that according to other aspects, various components such as the hosing 60, 70 and the quick fit connectors 68, 78 may be combined to form a single hosing and a single quick fit connector. The purge and/or filter cleansing aspects of the oil change service generally returns the reusable filter (or filters) to a like-new condition. In cases where the purge and/or filter cleansing aspects of the oil change service do not adequately clean the reusable filter, the autonomous oil change system 10 may alert the person associated with the vehicle that the reusable oil filter should be replaced.

For aspects of the autonomous oil change system 10 which do not include the purge system 24 and the filter cleansing system 26, or following completion of the purge and/or filter cleansing aspects of the oil change service, the person associated with the vehicle can then initiate 120 the evacuation aspect of the oil change service by attaching the quick fit connector 48 coupled to an end of the hosing 40 of the evacuation system 18 to the quick fit valve of the vehicle. According to various aspects, a sensor (e.g., one of the sensors 14) is configured to sense that the connection between the quick fit connector 48 and the quick fit valve of the vehicle has been made, generate a signal indicative of the connection having been made, and communicate the signal to the control circuit 22. Upon receipt of the signal, the control circuit 22 operates to allow the evacuation aspect of the oil change service to begin. According to various aspects, without the signal, the control circuit 22 operates as if the connection has not been made and prevents the evacuation aspect of the oil change service from beginning. In other words, the control circuit 22 locks out the evacuation aspect of the oil change service until the signal is communicated from the sensor.

For the evacuation aspect of the oil change service, the autonomous oil change system 10 "pulls" the oil from the engine sump to the quick fit valve of the vehicle, through the quick fit connector 48 and the hosing 40 of the evacuation system 18 and back to the "waste oil" container 42. The pressurized pulling (i.e., negative pressure) of the oil from the engine sump results in a more thorough and complete evacuation of the engine oil than is the case with traditional gravity draining.

Following completion of the evacuation aspect of the oil change service, the person associated with the vehicle can then change 122 the oil filter (or oil filters) of the vehicle or initiate 124 the refill aspect of the oil change service. The person associated with the vehicle (e.g., the service technician) may opt to change the oil filter if a conventional oil filter was removed from the vehicle or if a reusable filter was not adequately cleaned by the purge aspect, the filter cleansing aspect and the cleansing fluid purge aspect of the oil change service. The refill aspect of the oil change service may be initiated by attaching the quick fit connector 58 coupled to an end of the hosing 50 of the refill system 20 to the quick fit valve of the vehicle. According to various aspects, a sensor (e.g., one of the sensors 14) is configured to sense that the connection between the quick fit connector 58 and the quick fit valve of the vehicle has been made, generate a signal indicative of the connection having been made, and communicate the signal to the control circuit 22. Upon receipt of the signal, the control circuit 22 operates to allow the refill aspect of the oil change service to begin. According to various aspects, without the signal, the control circuit 22 operates as if the connection has not been made and prevents the refill aspect of the oil change service from beginning. In other words, the control circuit 22 locks out the refill aspect of the oil change service until the signal is communicated from the sensor.

For the refill aspect of the oil change service, the autonomous oil change system 10 "pushes" new clean motor oil from the "new oil" container 52 into the quick fit valve of the vehicle, where the new clean oil is then distributed to the engine of the vehicle via the oil filter (or oil filters). Based on the information regarding the vehicle model, make, year and engine, the control circuit 22 controls the delivery of the correct type, viscosity and volume of "new oil" to the engine of the vehicle.

According to various aspects, once a predetermined volume of oil has been delivered to the engine of the vehicle, the autonomous oil change system 10 can then prompt the person associated with the vehicle to "verify" the level of the oil in the engine by checking a dipstick of the engine. The driver can thereafter add or evacuate oil as necessary in order to achieve a desired oil level in the engine of the vehicle. At this point, the oil change process is complete.

The autonomous oil change system 10 is further configured to signal to the person associated with the vehicle that the oil change service has been completed, and to record the event for automatic billing to a customer account.

Figure 10:
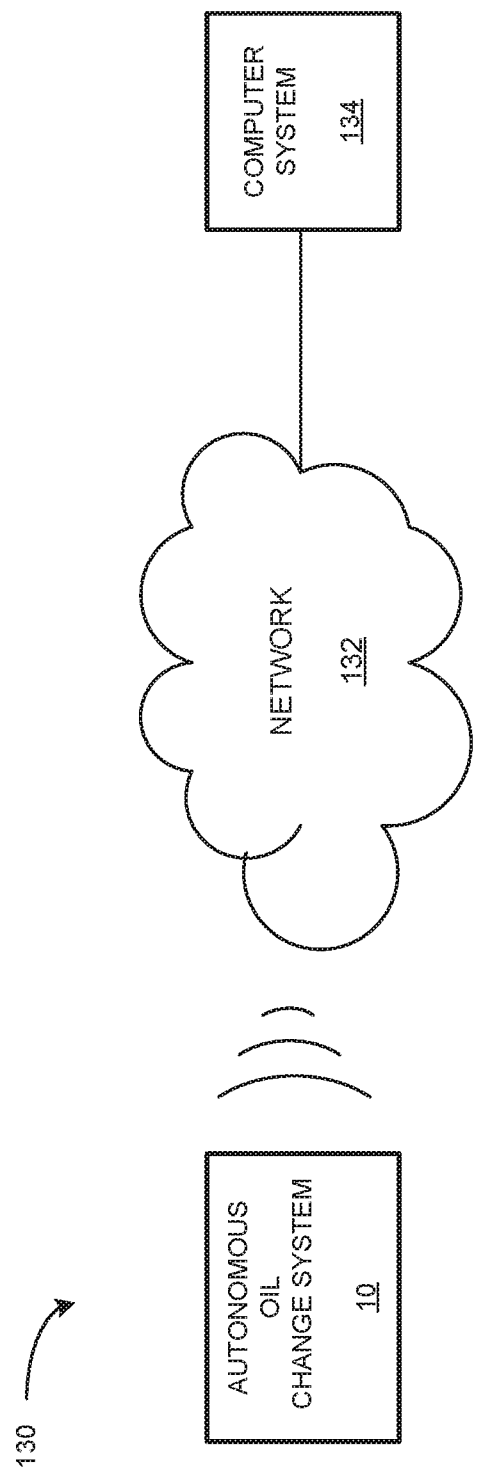
FIG. 10 illustrates a management system in accordance with at least one aspect of the present disclosure.

FIG. 10 illustrates a management system 130, in accordance with at least one aspect of the present disclosure. The management system 130 includes the autonomous oil change system 10 or the autonomous oil change system 100, a network 132 and one or more computing systems 134. The autonomous oil change system 10 or the autonomous oil change system 100 is communicably connected with the one or more computing systems 134 via the network 132. The network 132 may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 132 may include elements, such as, for example, intermediate nodes, proxy servers, routers, switches, and adapters configured to direct and/or deliver data. In general, the autonomous oil change system 10 is configured to communicate with the one or more computing systems 134 via the network 132 using various communication protocols (e.g., HTTP, TCP/IP, UDP, WAP, WiFi, Bluetooth) and/or to operate within or in concert with one or more other communications systems. As the autonomous oil change system 10 or the autonomous oil change system 100 can connect to the Internet, it will be appreciated that the autonomous oil change system 10 or the autonomous oil change system 100 can have a distinct Internet Protocol address (IP address) which allows for host or network interface identification and location addressing.

The one or more computing systems 134 can include, for example, a computing system of an owner of the autonomous oil change system 10 or the autonomous oil change system 100, a computing system of a service provider associated with the autonomous oil change system 10 or the autonomous oil change system 100, a computing system associated with an owner of the vehicle being serviced by the autonomous oil change system 10 or the autonomous oil change system 100, etc., and each of these computing systems can be at locations which are remote from the vehicle being serviced.

According to various aspects, at least one of the one or more computing systems 134 can function as an inventory management system. For example, as various oil filters are removed from the filter dispenser 106, the autonomous oil change system 10 or the autonomous oil change system 100 can send information regarding the inventory levels of the various oil filters to the computing system 134 so that the number of each different oil filter can be tracked in real-time or in near-real time. Similarly, as the autonomous oil change system 10 or the autonomous oil change system 100 knows the amount of new clean oil provided from the "new oil" container 52, the computing system 134 knows the inventory of the new clean oil in the "new oil" container 52 in real-time or in near-real time.

EXAMPLES

Example 1

An oil change system is provided. The oil change system comprises an evacuation system comprising a first quick connect fitting configured to mate with a quick connect valve of a vehicle, a refill system comprising a second quick connect fitting configured to mate with the quick connect valve of the vehicle, one or more sensors and a control circuit coupled to the evacuation system, the refill system and the one or more sensors. The control circuit is configured to automatically identify the vehicle, determine a type, a viscosity and a volume of oil associated with the vehicle and control a volume of new oil added to the vehicle.

Example 2

The oil change system of Example 1, wherein the evacuation system further comprises at least one of the following (1) a hose coupled to the first quick connect fitting, (2) a valve coupled to the first quick connect fitting and (3) a pump coupled to the first quick connect fitting.

Example 3

The oil change system of Examples 1 or 2, wherein the refill system further comprises at least one of the following (1) a hose coupled to the second quick connect fitting, (2) a valve coupled to the second quick connect fitting and (3) a pump coupled to the second quick connect fitting.

Example 4

The oil change system of Examples 1, 2 or 3, wherein a first one of the one or more sensors is configured to sense whether the first quick connect fitting is connected to the quick connect valve of the vehicle.

Example 5

The oil change system of Example 4, wherein a second one of the one or more sensors is configured to sense whether the second quick connect fitting is connected to the quick connect valve of the vehicle.

Example 6

The oil change system of Examples 1, 2, 3, 4 or 5, wherein the control circuit comprises a processing circuit, a memory circuit and a wireless communication module.

Example 7

The oil change system of Example 6, wherein the control circuit is further configured to identify the vehicle based on a signal received from the vehicle.

Example 8

The oil change system of Example 7, wherein the control circuit is further configured to determine the type, the viscosity and the volume of the oil associated with the vehicle.

Example 9

The oil change system of Examples 1, 2, 3, 4, 5, 6, 7 or 8, further comprising a purge system coupled to the control circuit.

Example 10

The oil change system of Example 9, further comprising a filter cleansing system coupled to the control circuit.

Example 11

The oil change system of Examples 1, 2, 3, 4, 5, 6, 7, 8, 9 or 10, further comprising a user interface coupled to the control circuit, wherein the user interface comprises at least one of the following (1) a display, (2) a keypad, (3) a scanner, (4) a card reader and (5) a printer.

Example 12

The oil change system of Examples 1, 2, 3, 4, 5, 6, 7, 8, 9, 10 or 11, further comprising a tool cabinet coupled to the control circuit, wherein the tool cabinet houses at least one filter wrench.

Example 13

The oil change system of Examples 1, 2, 3, 4, 5, 6, 7, 8, 9, 10, 11 or 12, further comprising a filter depository coupled to the control circuit, wherein the filter depository is configured to receive an oil filter removed from the vehicle.

Example 14

The oil change system of Examples 1, 2, 3, 4, 5, 6, 7, 8, 9, 10, 11, 12 or 13, further comprising a filter dispenser coupled to the control circuit, wherein the filter dispenser is configured to dispense a new oil filter for the vehicle.

Example 15

A method of performing an oil change service is provided. The method comprises automatically identifying a vehicle, evacuating oil from an engine of the vehicle via a first quick connect fitting configured to mate with a quick connect valve of a vehicle, determining a type, a viscosity and a volume of new oil, and controlling a volume of the new oil added to the engine of the vehicle via a second quick connect fitting configured to mate with the quick connect valve of the vehicle.

Example 16

The method of Example 15, wherein automatically identifying the vehicle comprises automatically identifying the vehicle based on a signal communicated from the vehicle.

Example 17

The method of Example 16, further comprising determining the type, the viscosity and the volume of the new oil based on the signal.

Example 18

The method of Examples 15, 16 or 17, further comprising introducing a purging agent to an oil filter of the vehicle.

Example 19

The method of Example 18, further comprising introducing a cleansing fluid to the oil filter of the vehicle.

Example 20

The method of Examples 15, 15, 17, 18 or 19, further comprising replacing an oil filter of the vehicle.

Although the various aspects of the autonomous oil change system have been described herein in connection with certain disclosed aspects, many modifications and variations to those aspects may be implemented. Also, where materials are disclosed for certain components, other materials may be used. Furthermore, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles. For example, although the invention was described in the context of an autonomous oil change system for a vehicle, the general principles of the invention are equally applicable to other types of autonomous fluid change systems for vehicles or other types of machines. Such other types of autonomous fluid change systems include, for example, autonomous transmission fluid change systems, autonomous hydraulic fluid change systems, autonomous steering fluid change systems, etc. Such other types of machines include, for example, earth moving machines (e.g., an excavator, a high-lift, a bulldozer, etc.), machines other than earth moving machines, mobile generators, etc.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. An oil change system, comprising:
    an evacuation system comprising a first quick connect fitting configured to mate with a quick connect valve of a vehicle;
    a refill system comprising a second quick connect fitting configured to mate with the quick connect valve of the vehicle;
    one or more sensors; and
    a control circuit coupled to the evacuation system, the refill system and the one or more sensors, wherein the control circuit is configured to automatically:
        identify the vehicle;
        determine a type, a viscosity and a volume of oil associated with the vehicle; and
        control a volume of new oil added to the vehicle.

2. The oil change system of claim 1, wherein the evacuation system further comprises at least one of the following:
    a hose coupled to the first quick connect fitting;
    a valve coupled to the first quick connect fitting; and
    a pump coupled to the first quick connect fitting.

3. The oil change system of claim 1, wherein the refill system further comprises at least one of the following:
    a hose coupled to the second quick connect fitting;

a valve coupled to the second quick connect fitting; and
a pump coupled to the second quick connect fitting.

4. The oil change system of claim 1, wherein a first one of the one or more sensors is configured to sense whether the first quick connect fitting is connected to the quick connect valve of the vehicle.

5. The oil change system of claim 4, wherein a second one of the one or more sensors is configured to sense whether the second quick connect fitting is connected to the quick connect valve of the vehicle.

6. The oil change system of claim 1, wherein the control circuit comprises:
a processing circuit;
a memory circuit; and
a wireless communication module.

7. The oil change system of claim 1, wherein the control circuit is further configured to automatically identify the vehicle based on a signal communicated from the vehicle and received by the control circuit.

8. The oil change system of claim 1, wherein the control circuit is further configured to automatically determine, based on the identified vehicle, the type, the viscosity and the volume of the oil associated with the vehicle.

9. The oil change system of claim 1, further comprising a purge system coupled to the control circuit.

10. The oil change system of claim 9, further comprising a filter cleansing system coupled to the control circuit.

11. The oil change system of claim 1, further comprising a user interface coupled to the control circuit, wherein the user interface comprises at least one of the following:
a display;
a keypad;
a scanner;
a card reader; and
a printer.

12. The system of claim 1, further comprising a tool cabinet coupled to the control circuit, wherein the tool cabinet houses at least one filter wrench.

13. The system of claim 1, further comprising a filter depository coupled to the control circuit, wherein the filter depository is configured to receive an oil filter removed from the vehicle.

14. The system of claim 1, further comprising a filter dispenser coupled to the control circuit, wherein the filter dispenser is configured to dispense a new oil filter for the vehicle.

15. A method of performing an oil change service, the method comprising:
utilizing a control circuit to automatically identify a vehicle;
evacuating oil from an engine of the vehicle via a first quick connect fitting configured to mate with a quick connect valve of a vehicle;
utilizing the control circuit to automatically determine a type, a viscosity and a volume of new oil; and
controlling a volume of the new oil added to the engine of the vehicle via a second quick connect fitting configured to mate with the quick connect valve of the vehicle.

16. The method of claim 15, wherein utilizing the control circuit to automatically identify the vehicle comprises automatically identifying the vehicle based on a signal communicated from the vehicle and received by the control circuit.

17. The method of claim 15, further comprising utilizing the control circuit to automatically determine, based on the identified vehicle, the type, the viscosity and the volume of the new oil.

18. The method of claim 15, further comprising introducing a purging agent to an oil filter of the vehicle.

19. The method of claim 18, further comprising introducing a cleansing fluid to the oil filter of the vehicle.

20. The method of claim 15, further comprising replacing an oil filter of the vehicle.

* * * * *